United States Patent [19]

Jourquin et al.

[11] 4,292,411
[45] Sep. 29, 1981

[54] PROCESS FOR PREPARING INTEGRAL SKIN POLYURETHANE AND POLYURETHANE SO OBTAINED

[75] Inventors: Lucien Jourquin, Wetteren; Eddie Du Prez, St. Maria Dudenhove, both of Belgium

[73] Assignee: S.A. PRB, Brussels, Belgium

[21] Appl. No.: 128,768

[22] Filed: Mar. 10, 1980

[30] Foreign Application Priority Data

Mar. 9, 1979 [LU] Luxembourg .................. 81024

[51] Int. Cl.$^3$ ............................................. C08G 18/14
[52] U.S. Cl. .................................... 521/51; 521/124; 521/128; 521/129
[58] Field of Search ............... 521/51, 124, 128, 129; 528/55

[56] References Cited

U.S. PATENT DOCUMENTS

| 3,235,518 | 2/1966 | Hostettler et al. | 521/124 |
| 3,714,077 | 1/1973 | Cobbledick et al. | 521/88 |
| 4,150,206 | 4/1979 | Jourquin et al. | 521/124 |
| 4,189,542 | 2/1980 | Kleinmann et al. | 521/124 |

Primary Examiner—Maurice J. Welsh
Attorney, Agent, or Firm—Sughrue, Mion, Zinn, Macpeak and Seas

[57] ABSTRACT

An improved process for preparing integral skin polyurethane, wherein a reaction mixture comprising polyol, polyisocyanate the NCO groups of which are not directly bonded to an aromatic group, no more than 0.5 part by weight of water to 100 parts by weight of polyol, and a catalyst is reacted in a mould, said improvement consisting in using as catalyst a synergistic combination of at least one organic initiator, comprising at least one functional group of primary or secondary amines, with at least one organic compound of bismuth.

30 Claims, No Drawings

PROCESS FOR PREPARING INTEGRAL SKIN POLYURETHANE AND POLYURETHANE SO OBTAINED

This invention relates to a process for preparing integral skin polyurethane, wherein a reaction mixture comprising polyol, polyisocyanate the NCO groups of which are not directly bonded to an aromatic group, no more than 0.5 part by weight of water to 100 parts by weight of polyol and a catalyst is reacted in a mould.

The technique for preparing integral skin polyurethane, the core of which is either as a microcellular foam or as an elastomer, has been known for some time and allows to obtain either by casting into a mould, or by injection (RIM technique) into a mould, in one step, a polyurethane product having a skin which is either microcellular or non-cellular and which gives this product a beautiful finish. By means of this technique, various products such as wood, leather and the like can be imitated. This technique finds its use in the furniture, automobile, electrotechnics and shoe industries for example.

The process for preparing integral skin polyurethane is a batchwise process so that in order that this process be profitable, times of moulding cycles must be relatively short and can only vary at most between 1 and 10 minutes.

For this reason, it has been usual to use in the reaction composition either relatively reactive aromatic isocyanates, namely isocyanates the NCO groups of which are directly bonded to an aromatic group, or so-called aliphatic or alicyclic isocyanates, namely isocyanates the NCO groups of which are not directly bonded to an aromatic group, in combination with a catalyst comprised of a synergistic combination of at least two different compounds allowing to substantially reduce the reaction time of these aliphatic isocyanates.

Aliphatic or alicyclic isocyanates are, however, particularly preferred due to their stability to discoloration.

As a matter of fact, it is known that polyurethanes obtained from aromatic polyisocyanates form by oxidation compounds with chromophore groups which are responsible for a yellowing effect. This oxidation is still accelerated under the influence of light.

Thus if such polyisocyanates are used, the colour ranges which can be used for products obtained by the process for preparing integral skin polyurethanes are very limited or require an additional protective treatment of the polyurethane surface. It results therefrom for example that products provided for furniture and transport fields, such as saddles, bumpers, instrument boards, cushions and the like, are made with very deep colours or even with a black colour in order to hide the future yellowing.

In other respects, in other applications, wherein lighter colors are preferred, colored products are subjected to an additional treatment by means of lacquers, for example by immersion in a bath of a protection product. This additional treatment is difficult and expensive. Such a problem does not exist when a so-called aliphatic polyisocyanate is used and the integral skin polyurethane obtained by means of this latter polyisocyanate shows a high stability against discoloration under the combined effect of oxidation and light, so that products made of such a polyurethane can have an infinite range of colors without necessitating any further additional treatment in order to retain the initial colour.

The essential object of the present invention is to provide a new very industrially and economically valuable process allowing to obtain, by means of a so-called aliphatic or alicyclic polyisocyanate, a polyurethane foam of a very good quality.

To this end, according to the invention, a synergistic combination of at least one organic initiator having at least one functional group of primary or secondary amines with at least one organic bismuth compound is used as catalyst.

Advantageously as organic bismuth compound, a compound of the general formula (I) is used:

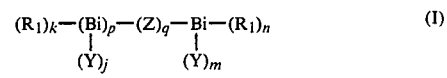

in which:
p=q=0 or 1
k+j=2 or 4 when p=q=1 or
k=j=0 when p=q=0
m+n=3 or 5 when k=j=p=q=0 or
m+n=2 or 4 when p=q=1
m+n≠0, m or n may possibly equal 0, but are not, however, simultaneously equal to 0;
$R_1$ is an alkyl ($C_1$-$C_{12}$) radical which is substituted or not, a phenyl radical, a cycloalkyl ($C_5$-$C_6$) radical or a halogen atom;
Z represents oxygen or sulfur;
Y is a halogen atom, a —O—CO—$R_2$, —O$R_2$, —S$R_2$,

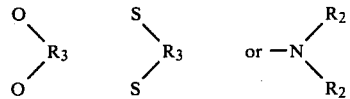

group wherein $R_2$ may represent (1) an alkyl ($C_1$-$C_{20}$) radical, an alkenyl ($C_2$-$C_{20}$) radical, a cycloalkyl ($C_5$ or $C_6$) radical, a phenyl radical, a benzyl radical, which are unsubstituted or substituted by one or more alkyl ($C_1$-$C_{12}$) or alkenyl ($C_2$-$C_{12}$) radicals, one or more halogen atoms, one or more hydroxy, —OR, —N(R)$_2$ or —SR radicals, or (2) a phenyl radical which is substituted by one or more CHO, —CO—R or COOR groups, R being an alkyl ($C_1$-$C_{12}$), alkenyl ($C_2$-$C_{12}$), cycloalkyl ($C_5$-$C_6$), phenyl, benzyl radical, which is unsubstituted or substituted by one or more alkyl ($C_1$-$C_{12}$) or alkenyl ($C_2$-$C_{12}$) radicals, one or more halogen atoms or hydroxy radicals, and
$R_3$ is a group (—C$R_4R_5$)$_x$ wherein x=2 or 3 and $R_4$ and $R_5$=H, CH$_3$ or C$_2$H$_5$.

The invention concerns as well products the core of which has a microcellular structure as products having a non-cellular elastomer structure. This is also the case for the integral skin which may thus be as well microcellular as non-cellular elastomer according to the applications.

Other details and features of the invention will become apparent from the description given hereinafter, by way of non limitative example, of some particular embodiments of the invention.

In general, the object of the invention is to provide a new product allowing to extend the molding technique of polyurethanes, by casting or injection for example, to a polyurethane presenting a very high colour stability while having moreover physical or chemical characteristics which are at least comparable to those of conventional polyurethanes such as obtained by moulding.

It is known that yellowing of conventional polyurethanes is due to use of aromatic polyisocyanates which form by oxidation, degradation products having chromophore groups.

A reactivity problem exists however if said polyisocyanates are substituted by aliphatic or alicyclic polyisocyanates.

Thus one of the essential objects of the invention is to provide catalysts allowing to obtain without needing an important modification of the conventional technology and under industrially and economically valuable conditions, a polyurethane meeting commercial requirements relating to colour stability.

Thus, according to the invention, it has been found that by a suitable combination of at least two kinds of compounds, some of which are already known as distinct catalyst or even as another possible ingredient in the polyurethane preparation, it is possible to gain unexpected results of reactivity with polyisocyanates the NCO groups of which are not directly bonded to an aromatic group, in the conventional processes for preparing polyurethane by moulding.

According to the invention, it has been found that the association of some of such compounds forms a really synergistic catalyst combination allowing to bring polyisocyanates the NCO groups of which are not directly bonded to an aromatic group up to the same level on a reactivity point of view as polyisocyanates the NCO groups of which are directly bonded to an aromatic group and which are generally called aromatic polyisocyanates.

Being given that the essential effect which is sought is the colour stability of polyurethanes such as obtained, a preference is given to aliphatic and alicyclic polyisocyanates.

Suitable polyisocyanates for the present invention have for example been described in Luxemburg Pat. No. 68,552, French Pat. No. 2,077,383 and Canadian Pat. No. 918,675.

Such polyisocyanates are for example the following: ethylene diisocyanate, propylene 1.2-diisocyanate, ethylidene diisocyanate, 2.2.4-trimethylhexamethylene diisocyanate, hexamethylene diisocyanate, cyclohexylene 1.2-diisocyanate, 3-isocyanatomethyl-3.5.5-trimethylcyclohexylisocyanate, m- and p-xylylene diisocyanate, 4.4'-methylene bis(cyclohexylisocyanate), 2.4'-(4.4')-methylene-bis(cyclohexylisocyanate), 2-methyl-1.3-cyclohexylene diisocyanate, bis(2-isocyanatoethyl)-carbonate, polyisocyanate H3150 of Veba-Chemie, xylylene isocyanate.

It has been more particularly found that following isocyanates allow to obtain very valuable products: hexamethylene diisocyanate, 2.4.4-trimethylhexamethylene diisocyanate, 2.4'-(4.4')-methylene bis-(cyclohexylisocyanate), 3-isocyanatomethyl-3.5.5-trimethylcyclohexylisocyanate, H 3150, xylylene isocyanate.

It is also possible to provide use of prepolymers from said polyisocyanates as described for example in Canadian Pat. No. 822,188.

The content of NCO groups in the prepolymer is preferably about at least 10%, preferably about at least 20%, the NCO index being able to vary between 70 and 140, preferably between 90 and 120.

Polyols which are used are usually those which are suitable in the conventional processes for preparing integral skin polyurethanes, as well as the kinds of polymer polyols, such as for example the polyol known under the trade name "Niax CM" of Union Carbide.

The kind of polyols used varies amongst others as a function of the desired final product.

In general polyols can be of the polyester or polyether type.

Polyether polyols are formed by polyoxyalkylene compounds having terminal OH groups, which are linear or ramified, obtained by polyaddition of polypropylene oxide and/or ethylene oxide on low molecular weight compounds comprising at least two hydroxy or amino groups as described for example in Canadian Pat. No. 918,675, U.S. Pat. No. 3,778,390 and German Pat. No. 2,354,952.

The most currently used polyether polyols for preparing flexible and/or semi-rigid integral skin foams are formed from slightly cross-linked polyoxyethylene-polyoxypropylene copolymers having 2 or 3 terminal OH groups per molecule, such as diols, and having a hydroxyl number of about 20 to 100, preferably 25 to 50, the content of active terminal primary hydroxy groups being generally of about at least 30%, preferably of about at least 50%. The most currently used polyethers in the preparation of rigid polyurethanes are ramified polyoxypropylene adducts having at least three terminal OH groups per molecule and a hydroxyl number of about 200 to 600.

Polyester polyols are esterification products having at least 2 terminal hydroxy groups obtained by condensation of polycarboxylic acids with excess of a low molecular weight product having at least two functional (hydroxy or amino) groups, for example such as described in French Pat. No. 2,077,383, Canadian Pat. No. 918,675 and German Pat. No. 2,354,952, and also those such as obtained by open chain polymerization of caprolactone.

For preparation of flexible or semi-flexible integral skin polyurethanes, a preference is given to polyester polyols having a functionality of 2 or 3 and a hydroxyl number of about 20 to 100, more particularly of about 30 to 70, while, for preparing rigid integral skin polyurethanes, a preference is given to those presenting a functionality of at least 3 and a hydroxyl number between 200 and 600.

As already mentioned hereinbefore, the selection of the catalyst is of prime importance, according to this invention.

As a matter of fact, if in conventional systems for preparing integral skin polyurethanes, the aromatic polyisocyanate is replaced by a non-aromatic polyisocyanate, the problem of a low reactivity is raised, which does not allow to create the energetic reaction balance which is necessary to get, on the one hand, short enough moulding cycles and, on the other hand, a final product having valuable physical properties and a valuable commercial aspect.

Thus according to the invention, as already described hereinbefore, selective catalysts have been proposed which allow to activate NCO groups of non-aromatic polyisocyanates in the manufacture of integral skin polyurethanes, namely according to a batchwise process of casting or injection in a mould, which is industrially and economically profitable, the cycle times of which are consequently relatively short and the final product of which meets the industrial requirements.

A specific characteristic of the process for preparing integral skin polyurethane foam is that the water content in the reaction composition is relatively low and is at most 0.5 part by weight of water to 100 parts by weight of polyol.

Consequently, when the catalyst are being selected, this limitation has to be taken into account.

According to the invention, it has been found that an association of at least an organic bismuth compound with at least an organic initiator having at least a functional group of primary or secondary amines advantageously allows to form, owing to a synergistic effect, a catalyst which selectively promotes the reaction between NCO groups of the above-mentioned non-aromatic polyisocyanate and the amine groups or optionally OH groups.

Owing to the very high synergistic effect such as obtained with this association, it has been found unexpectedly that the activity of NCO groups of non-aromatic polyisocyanates has substantially been brought up to the activity level of NCO groups of aromatic polyisocyanates. If follows therefrom that the valuable processes for reaction compositions containing aromatic polyisocyanate are also suitable for reaction compositions containing non-aromatic polyisocyanates.

The catalytic combination according to the invention, such as hereinbefore defined, can optionally be completed by conventional catalysts of amine and/or organo-metal type, which in the case of aromatic isocyanates, are very useful but generally are not essential in the present invention.

Such tertiary amines are for example described in U.S. Pat. No. 3,799,898 and amongst these amines, triethylene diamine is the most usual.

Traditional organo-metal catalysts are described in general in the same U.S. patent. In general, their content is not higher than 0.5 part by weight to 100 parts by weight of polyol. The most currently used catalysts are organic tin compounds, and particularly tin dibutyldilaurate, the content of which varies between 0.02 and 4 parts by weight with respect to 100 parts by weight of polyol.

As organic bismuth compound, a compound of the general formula I is preferably used:

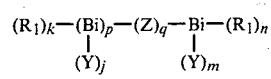

in which:
$p = q = 0$ or $1$
$k + j = 2$ or $4$ when $p = q = 1$ or
$k = j = 0$ when $p = q = 0$
$m + n = 3$ or $5$ when $k = j = p = q = 0$ or
$m + n = 2$ or $4$ when $p = q = 1$
$m + n \neq 0$, m or n may possibly equal 0, but are not, however, simultaneously equal to 0;
$R_1$ is an alkyl ($C_1-C_{12}$) radical which is substituted or not, a phenyl radical, a cycloalkyl ($C_5-C_6$) radical or a halogen atom;
Z represents oxygen or sulfur;
Y is a halogen atom, a $-O-CO-R_2$, $-OR_2$, $-SR_2$,

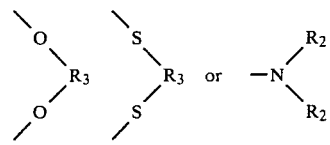

group wherein $R_2$ may represent (1) an alkyl ($C_1-C_{20}$) radical, an alkenyl ($C_2-C_{20}$) radical, a cycloalkyl ($C_5$ or $C_6$) radical, a phenyl radical, a benzyl radical, which are unsubstituted or substituted by one or more alkyl ($C_1-C_{12}$) or alkenyl ($C_2-C_{12}$) radicals, one or more halogen atoms, one or more hydroxy, $-OR$, $-N(R)_2$ or $-SR$ radicals, or (2) a phenyl radical which is substituted by one or more CHO, $-CO-R$ or COOR groups, R being an alkyl ($C_1-C_{12}$), alkenyl ($C_2-C_{12}$), cycloalkyl ($C_5-C_6$), phenyl, benzyl radical, which is unsubstituted or substituted by one or more alkyl ($C_1-C_{12}$) or alkenyl ($C_2-C_{12}$) radicals, one or more halogen atoms or hydroxy radicals, and
$R_3$ is a group $(-CR_4R_5)_x$ wherein $x = 2$ or $3$ and $R_4$ and $R_5 = H$, $CH_3$ or $C_2H_5$.

It has been more particularly found that, amongst said organic bismuth compounds, compounds of following Table I are very effective.

TABLE 1

| No. | Formula | k + j | k | j | p = q | n + m | n | m | R1 | Y | Z |
|---|---|---|---|---|---|---|---|---|---|---|---|
| 1 | II | 0 | 0 | 0 | 0 | 3 or 5 | | | alkyl, phenyl, cycloalkyl | —O—CO—R$_2$ | — |
| 2 | III | 0 | 0 | 0 | 0 | 3 or 5 | 0 | 3 or 5 | — | —O—CO—R$_2$ | — |
| 3 | II | 0 | 0 | 0 | 0 | 3 or 5 | | | alkyl, phenyl, cycloalkyl | halogen | — |
| 4 | IV | 2 or 4 | 2 or 4 | 0 | 1 | 2 or 4 | 2 or 4 | 0 | alkyl, phenyl, cycloalkyl | — | O or S |
| 5 | V | 2 or 4 | | | 1 | 2 or 4 | | | alkyl, phenyl, cycloalkyl | —O—CO—R$_2$ or halogen | O or S |
| 6 | III | 0 | 0 | 0 | 0 | 3 or 5 | 3 or 5 | 0 | alkyl, phenyl, cycloalkyl | — | — |
| 7 | II | 0 | 0 | 0 | 0 | 3 or 5 | | | halogen | —O—CO—R$_2$ | — |
| 8 | III | 0 | 0 | 0 | 0 | 3 or 5 | 0 | 3 or 5 | — | OR$_2$ or SR$_2$ | — |

TABLE 1-continued

| No. | Formula | k + j | k | j | p = q | n + m | n | m | R1 | Y | Z |
|-----|---------|-------|---|---|-------|-------|---|---|-----|---|---|
| 9 | II | 0 | 0 | 0 | 0 | 3 | 1 | 2 | alkyl, phenyl, cycloalkyl | 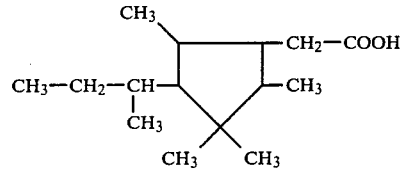 | — |
| 10 | II | 0 | 0 | 0 | 0 | 3 or 5 | | | alkyl, phenyl, cycloalkyl | —OR$_2$ or —SR$_2$ | — |
| 11 | II | 0 | 0 | 0 | 0 | 3 or 5 | 0 | 3 or 5 | halogen | —OR$_2$ or —SR$_2$ | — |
| 12 | III | 0 | 0 | 0 | 0 | 3 or 5 | 0 | 3 or 5 | — | $-N\begin{smallmatrix}R_2\\R_2\end{smallmatrix}$ | — |
| 13 | II | 0 | 0 | 0 | 0 | 3 or 5 | | | alkyl, phenyl, cycloalkyl | $-N\begin{smallmatrix}R_2\\R_2\end{smallmatrix}$ | |

The formulae to which it is referred to in this Table I are the following:

$$(Y)_m-Bi-(R_1)_n \quad (II)$$

$$Bi(Y)_m \quad (III)$$

$$(R_1)_k-Bi-Z-Bi-(R_1)_n \quad (IV)$$

$$(R_1)_k-Bi-Z-Bi-(R_1)_n \atop \phantom{xxx}|\phantom{xxxxx}| \atop \phantom{xxx}(Y)_j\phantom{xx}(Y)_m \quad (V)$$

In this table, compounds having structures 1 to 5 are preferred.

More particularly in formulae I to V, the following substituents are considered as being of high interest:

R$_1$: alkyl C$_1$–C$_4$ radicals, phenyl radical or a halogen atom;

Z: oxygen

R$_2$: (a) phenyl and benzyl radicals;
 (b) alkyl (C$_1$–C$_{12}$) radicals, more particularly radicals of organic salts of carboxylic acids selected from the group comprising acetate, propionate, butyrate, amylate, hexoate, octoate, 2-ethylhexanoate, decanoate, nonoate, undecanoate and laurate;
 (c) radicals issuing from naphthenic acid, being a natural product forming a mixture of substituted cycloptenanes, R$_2$COOH, such as:

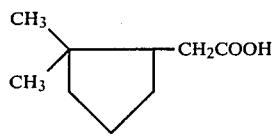

and

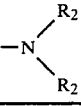

(d) radicals of formula —CR'$_s$R''$_r$ wherein s+r=3: R' and R'' are a chlorine or bromine atom or hydrogen;
 (e) radicals (CH$_2$)$_i$OH, (CH$_2$)$_i$OR, (CH$_2$)$_i$N(R)$_2$ and (CH$_2$)$_i$SR, wherein i may vary from 1 to 4;

Y: radicals —O—CO—R$_2$ and halogen atoms.

Compounds comprising trivalent bismuth are preferred.

When in formulae I to V one of the substituents is a halogen atom, chlorure and bromine atoms are preferred.

The term initiator means according to the invention the organic products containing at least a functional group constituted by primary or secondary amine. Moreover, the initiator can comprise in its molecule a combination of NH and NH$_2$ groups, and also of hydroxy groups.

In general, the initiators have at least one of the three following functions: quick starting of the reaction, opening of the cells at the end of the reaction and extension or cross-linking of the chains.

An initiator which meets said three functions together is preferably used.

Quick starting of the reaction allows the creaming and rise time to be reduced due to an important heat evolution at the beginning of the isothermal reaction with isocyanate.

To obtain a sufficient opening of the cells at the end of the reaction is important to prevent the shrinkage problems.

Finally, in order that the initiator is also able to act as a cross-linking agent or chain extender agent, it must comprise at least two functional groups for the isocyanate which is present. Initiators meeting said last condition also allow to accelerate the gel time and have a direct influence on the physical properties of the final product, such as mechanical properties, toughness and the like. It results therefrom that a preference is given to initiators comprising at least two functional groups in their molecule.

Hereinafter some specific examples of initiators are given, which are grouped according to the nature and the number of functional groups comprised therein:

(1) initiators with only one $NH_2$ group as functional group:

ethylamine, butylamine, hexylamine, laurylamine, octylamine, propylamine, pentylamine, heptylamine, nonylamine, decylamine, undecylamine, heptadecylamine, oleylamine, benzylamine, allylamine, N-2-aminoethylmorpholine, N-3-aminopropylmorpholine, cyclohexylamine, 2(3,4)-chlorobenzylamine, 1.3-dimethylbutylamine, 2,5-dimethylbenzylamine, o(m,p)-methoxybenzylamine, 3N-dimethyl-(diethyl)amino-1.3-propanediamine, 2-amino-5N-diethylaminopentane, N-(3-aminopropyl)-2-pyrrolidone.

(2) initiators having only one NH group as functional group:

diethylamine, di(iso)propylamine, dibutylamine, dioctylamine, dihexylamine, dinonylamine, dicyclohexylamine, N-methyloctadecylamine, N-ethyl- and N-propylbenzylamine, pyrazole, pyrrole, pyrrolidine, piperidine, morpholine, 2-(2-hydroxyethyl)-piperidine, bis(2-chloroethyl)amine, N,N-bis(2.2-diethoxyethyl)amine.

(3) initiators having two $NH_2$ groups as functional groups:

1.2-diaminopropane, 1.3-diaminopropane, ethylene diamine, 1,4-diaminobutane, 1.5-diaminopentane, 1.6-diaminohexane, 1.10-diaminodecane, 1.12-diaminododecane, isophorondiamine, 2.2.4-trimethyl-hexamethylenediamine, "Jeffamines D 230, D 400, D 1000" (which are commercial products of the firm Jefferson), 1.4-bis(3-aminopropyl)piperazine.

(4) initiators having two NH groups as functional groups:

N,N'-dimethyl-(diethyl)-ethylenediamine and 4,4'-trimethylenedipiperidine;

(5) initiators containing at least a $NH_2$ group and at least a NH group as functional groups:

3-ethylamino-1-propylamine, 3-butylamino-1-propylamine, 3-propylamino-1-propylamine, "Dinorams et Trinorams" (commercial products of the firm Pierrefitte - Auby, France), diethylenetriamine, triethylenetriamine, tetraethylenepentamine, pentaethylenehexamine, N-isopropyl-2-methyl-1.2-propanediamine, N-(2-aminoethyl)-piperazine, 1-(β-aminoethyl)-2-imidazolidone, 3,3'-imino-bispropylamine, bis(2-aminopropyl)-amine, bishexamethylene-triamine.

(6) initiators comprising at least one NH group and/or $NH_2$ group and also at least one or more hydroxy groups:

monoethanolamine, isopropanolamine, 3-amino-1-propanol, 3-amino-1.2-propanediol, 2-amino-2-methyl-1-propanol, 2-amino-2-methyl-1.3-propanediol, 2-amino-1-butanol, 6-amino-1-hexanol, 1.3-diamino-2-propanol, diethanolamine, diisopropanolamine, 2-(2.2-aminoethylamino)ethylamino-ethanol, N-aminoethylethanolamine, N.N'bis(2-hydroxyethyl)-1.2-diaminocyclohexane, N.N'-hydroxyethyl-ethylenediamine, N(3-aminopropyl)-diethanolamine, tris(hydroxymethyl)-aminoethane and 2-(2-methanolamino)-ethylaminoethanol.

The content of organic bismuth compound is generally of 0.1 to 10 parts by weight, preferably 0.2 to 4 parts by weight to 100 parts by weight of polyol.

In the case of the catalytic combination should contain a monofunctional initiator, its content is generally between 0.2 and 5 parts by weight, preferably from 0.2 to 3 parts by weight to 100 parts by weight of polyol, while if it is an initiator which is at least difunctional, its content is generally, in the catalytic combination, 0.2 to 30 parts by weight, preferably 1 to 10 parts by weight to 100 parts y weight of polyol.

Furthermore, if the content of polyfunctional initiator is lower than 2 parts by weight with respect to 100 parts by weight of polyol, it is essential in order to obtain good reaction conditions, to incorporate in addition, in the reaction composition, a cross-linking agent, which is generally constituted by a compound having a relatively low molecular weight and having at least two functional groups, in most cases hydroxy groups, which are reactive with respect to isocyanate groups.

Said cross-linking agents may also have as one of their effect, an extension of chains in the final product, and are moreover currently used in the conventional processes for preparing integral skin polyurethanes.

Typical examples of such cross-linking agents are: butanediol, ethylene glycol, diethylene glycol, triethanolamine, glycerine, trimethylolpropane, "Thanol C150" (commercial product of the firm Jefferson), polyol "Niax 327" (commercial product of the firm Union Carbide), hexanediol, propylene glycol, neopentyl glycol, dipropylene glycol, "quadrol" (commercial product of the firm Jefferson),"Niax Pental LA 700" (Commercial product of the firm Union Carbide), and in fact polydiols of the polyether and polyester type having a hydroxyl number equal to or lower than 200. The contents of cross-linking agent may generally vary between 5 to 20 parts by weight to 100 parts by weight of polyol.

If the content of polyfunctional initiator is at least 2 parts by weight, preferably 4 parts by weight to 100 parts by weight of polyol, use of cross-linking agents is not absolutely essential but could however be useful according to the reaction scheme and the physical properties of desired final products.

It may be still mentioned that examples of such cross-linking agents (cross-linkers and/or chain extenders) are cited in U.S. Pat. No. 2,354,952 and in Canadian Pat. Nos. 822,188 and 918,675. Use of such a cross-linking agent is thus necessary if one uses as catalytic combination one of the hereinbefore described system, which does not contain any polyfunctional initiator in ratios higher than 2 parts by weight to 100 parts by weight of polyol, as already mentioned previously.

Swelling agents which can be used in the process according to the invention correspond to agents currently used in the conventional process for preparing integral skin polyurethane from aromatic polyisocyanate. As physical swelling agent, one preferably uses trichlorofluoromethane and methylene chloride or mixtures of both said substances, in a ratio of 2 to 30 parts by weight to 100 parts by weight of polyol. The content of chemical swelling agent, which is water substantially in most cases, is lower than or equal to 0.5 part by weight to 100 parts by weight of polyol.

Surface active agents are generally not used in the preparation of flexible or semi-flexible polyurethanes having an integral skin but may be on the contrary useful in the preparation of rigid integral skin polyurethanes. In general, use of polydimethylsiloxane-polyoxyalkylene copolymers is provided. In some cases, active surface-active agents without silicone may be used.

Finally, the reaction composition may comprise pigments, antioxidants and the like as currently used in conventional polyurethane foams. Addition of antioxidants of the organic phosphite type and of UV absorbers allows to ensure an additional improvement when considering the resistance to yellowing and the degradation under the influence of oxygen and light.

Hereinafter in a series of tables, examples of preparation of specific polyurethanes with integral skin are grouped in order to more completely illustrate the process according to the invention.

TABLE II

Series I: Semi-flexible integral skin foams, molded density: 200–500 kg/m$^3$

| | Example No. | | | |
|---|---|---|---|---|
| | 1 | 2 | 3 | 4 |
| (1) Formulation | | | | |
| (Ingredients) | | | | |
| Polyol | Terc. 555:100 | D 3900:100 | E 39:100 | CP 4800:100 |
| Isocyanate | Prep.IPDI/BD:36.7 (30% NCO) | IPDI:50.6 | H 3150:54.1 | Hylene W:42.2 |
| NCO number | 95 | 110 | 100 | 105 |
| Swelling Agent(s) | TCFM:18 | TCFM:10/MC:10 | TCFM:13/MC:5 | TCFM:20 |
| Cross-linking agent | DPG:7/quadrol:3 | EG:8 | BD:8/TMP:2 | BD:10 |
| Catalysis | Cat.Bi*/DIPA:3 | Cat.Bi*/2-amino-1-hydroxy-butane:4 | Cat.Bi*/DEOA:7 | Cat.Bi*/1.3-dimethylbutylamine:2 |
| Antioxidants | TPP:3/Tris:2/Absorber UV:0.3 | same ex. no. 1 | same ex. no. 1 | same ex. no. 1 |
| *Cat.Bi:organobismuth catalyst | (a) cat. 1:1.5<br>(b) cat. 3:2<br>(c) cat. 5:1 | (a) cat. 6:1.5<br>(b) cat. 8:2<br>(c) cat. 9:2 | (a) cat. 10 bis:2<br>(b) cat. 11:2.5<br>(c) cat. 15:1.5 | (a) cat. 18:2<br>(b) cat. 20:3<br>(c) cat. 23:5 |
| (2) Reaction characteristics | | | | |
| (ex machine) | | | | |
| Free RG | 85–98 | 92–104 | 89–100 | 97–115 |
| CRT | 7–10 | 8–12 | 8–13 | 9–12 |
| RT | 18–23 | 20–23 | 19–24 | 21–25 |
| TFT | 20–26 | 21–26 | 22–29 | 25–30 |
| (3) Properties of molded product (with skin) | | | | |
| RG molded | 202–225 | 294–321 | 289–311 | 487–516 |
| Shore A | 23–27 | 36–43 | 44–51 | 58–63 |
| ER | 121–137 | 142–160 | 155–168 | 203–240 |
| RR | 3000–3400 | 2700–3100 | 2800–3200 | 2700–3000 |
| TR | 17–21 | 20–24 | 21–24 | 26–31 |
| Xenon test (blue scale) | 8 | 8 | 8 | 8 |

Series II: Semi-rigid integral skin foams (microcellular elastomers), molded density: ± 1000 kg/M$^3$

| | Example No. | | | |
|---|---|---|---|---|
| | 5 | 6 | 7 | 8 |
| (1) Formulation | | | | |
| (Ingredients) | | | | |
| Polyol | D 3900:100 | D 7963:100 | CM 11:100 | C 36-1:100 |
| Isocyanate | Prep.Hylene W/DPG: 99.5 (26% NCO) | XDI:59.4 | IPDI:63.3 | H 3150:75.5 |
| NCO number | 90 | 100 | 100 | 100 |
| Swelling Agent(s) | TCFM:7 | MC:7 | TCFM:7 | MC:5/water:0,3 |
| Cross-linking Agent(s) | BO:17/TEOA:2 | di EG:20/Glycer.:2 | EG:10/Quadrol:4 | DPG:15/TMP:4 |
| Catalysis | Cat.Bi*/tris(hydroxymethyl)aminomethane:4 | Cat.Bi*/N-aminoethylethanol-amine:5 | Cat.Bi*/N,N'-hydroxyethyl-ethylene diamine:5 | Cat.Bi*/DEOA:10 |
| Antioxidants | PDDP:4/UV abs.:0,5 | same ex. 5 | same ex. 5 | same ex. 5 |
| Surface-active agent | DC 193:0,5 | | | |
| *Cat.Bi = organobismuth catalyst | (a) cat. 2:2.5<br>(b) cat. 4:3<br>(c) cat. 5:2 | (a) cat. 6:2<br>(b) cat. 7:2.5<br>(c) cat. 10:2 | (a) cat. 12:2.5<br>(b) cat. 13:3<br>(c) cat. 14:2,5 | (a) cat. 16:3<br>(b) cat. 18:2<br>(c) cat. 19:3 |
| (2) Reaction characteristics | | | | |
| (ex.machine) | | | | |
| Free RG | 200–223 | 196–215 | 185–199 | 198–220 |
| CRT | 3–5 | 4–5 | 4–6 | 4–7 |
| RT | 8–12 | 9–12 | 10–13 | 11–13 |
| TFT | 8–12 | 9–12 | 10–13 | 11–13 |
| (3) Properties of molded product (with skin) | | | | |
| RG molded | 972–1014 | 962–988 | 948–980 | 990–1035 |
| Shore D | 55–57 | 50–54 | 53–57 | 55–60 |
| ER | 102–126 | 100–127 | 95–103 | 99–112 |
| RR | 16500–18400 | 16000–18400 | 20200–24900 | 17400–19500 |

TABLE II-continued

| | | | | |
|---|---|---|---|---|
| TR | 910–950 | 880–950 | 680–730 | 710–750 |
| E flexure module | 410–435 | 370–395 | 400–435 | 390–420 |
| Xenon test (blue scale) | 8 | 8 | 8 | 8 |

Series III: Rigid integral skin foams ("duromers"), molded density: ± 600 kg/m³

| | Examples No. | | | |
|---|---|---|---|---|
| | 9 | 10 | 11 | 12 |
| (1) Formulation | | | | |
| (Ingredients) | | | | |
| Polyol | G 310:100 | PRX:100 | UG 3602:50/PCP303:50 | UG 3540:100 |
| Isocyanate | IPDI:152.3 | Hylene W:149.3 | Prep.IPDI/G310: 152 (30% NCO) | Prep.TMDI/PRX:157 (32% NCO) |
| NCO number | 110 | 110 | 100 | 105 |
| Swelling agent(s) | TCFM:11/water:0.2 | MC:11 | TCFM:9 | MC:9/water:0.3 |
| Cross-linking agent(s) | BED:9/Quadrol:2 | Glycerine:7 | PG:6/TMP:2 | Glyc.5/TEOA:4 |
| Catalysis | Cat.Bi*/IPDA:3 | Cat.Bi*/diethyle-netriamine:3 | Cat.Bi*/4.4'-trimethy-lene-piperidine:3 | Cat.Bi*/morpholi-ne:2 |
| Antioxidant | TIDP:5/UV.abs.:0.5 | same ex. 9 | same ex. 9 | same ex. 9 |
| *Cat.Bi: | (a) cat. 1:2 | (a) cat. 10:2 | (a) cat. 17:2 | (a) cat. 22:4 |
| organobismuth | (b) cat. 5:1.5 | (b) cat. 11:1.5 | (b) cat. 18:1.5 | (b) cat. 24:3 |
| catalyst | (c) cat. 6:1.5 | (c) cat. 15:2 | (c) cat. 20:1.5 | (c) cat. 27:3 |
| (2) Reaction characteristics | | | | |
| (ex machine) | | | | |
| Free RG | 94–108 | 100–112 | 102–111 | 98–108 |
| CRT | 7–10 | 8–10 | 7–10 | 9–12 |
| RT | 37–47 | 40–47 | 39–45 | 42–50 |
| TFT | 15–19 | 17–20 | 19–22 | 20–25 |
| (3) Properties of molded product (with skin) | | | | |
| RG molded | 564–592 | 584–605 | 590–624 | 587–611 |
| Shore D | 72–75 | 75–80 | 80–83 | 78–82 |
| Impact strength | 0.8–1.1 | 0.9–1.1 | 1.1–1.3 | 1.2–1.5 |
| HDT | 82–85 | 85–89 | 92–96 | 88–91 |
| E flexure modules | 590–625 | 620–655 | 715–760 | 700–735 |
| Xenon test (blue scale) | 8 | 8 | 8 | 8 |

Series IV: Non-cellular polyurethanes, elastomer types (semi-rigid and rigid), molded density ± 1100–1200 kg/m³

| | Examples No. | | |
|---|---|---|---|
| | 13 | 14 | 15 |
| (1) Formulation | | | |
| (Ingredients) | | | |
| Polyol | D 3900:100 | F 50:100 | Ug 3540:100 |
| Isocyanate | Prep.IPDI/BD:81.4 (30% NCO) | Hylene W:80.2 | Prep.IPDI/EG: 172.4 (32% NCO) |
| NCO number | 100 | 95 | 105 |
| Cross-linking Agent(s) | BD:20/TEOA:3 | BD:20 | EG:7/TMP:2 |
| Catalysis | Cat.Bi*/cyclohexyla-mine:1.5 | Cat.Bi*/isopropanol-amine:4 | Cat.Bi*/1.3 diaminopropa-nol:4 |
| Antioxidants | PDDP:4/UV Abs.:0,3 | same ex. 13 | same ex. 13 |
| Surface active agent | LK 221:0.5 | same ex. 13 | same ex. 13 |
| *Cat.Bi: | (a) cat. 21:2.5 | (a) cat. 29:3 | (a) cat. 33:2 |
| organobismuth catalyst | (b) cat. 25:2 | (b) cat. 30:2.5 | (b) cat. 34:2 |
| | (c) cat. 26:2.5 | (c) cat. 31:2.5 | (c) cat. 35:1.5 |
| | (d) cat. 28:2.5 | (d) cat. 32:3 | |
| (2) Reaction characteristics | | | |
| PL | 29–36 | 34–40 | 8–12 |
| (3) Properties of molded product | | | |
| Shore D | 61–64 | 63–66 | 89–93 |
| ER | 140–176 | 182–203 | — |
| RR | 23100–25500 | 20800–24600 | — |
| Impact strength | — | — | 1.3–1.6 |
| HDT | — | — | 91–95 |
| E flexure modulus | 450–485 | 465–490 | 750–810 |
| Xenon test (blue scale) | 8 | 8 | 8 |

TABLE III

Formulae of bismuth compounds of example of Table II

| Reference number of Bi compound used in examples | Chemical formula | Number of formula of Table I |
|---|---|---|
| 1 | $(C_4H_9)_2Bi(O-\underset{\underset{O}{\|}}{C}-C_7H_{15})$ | 1 |

TABLE III-continued

Formulae of bismuth compounds of example of Table II

| Reference number of Bi compound used in examples | Chemical formula | Number of formula of Table I |
|---|---|---|
| 2 | $CH_3-Bi(O-\underset{\underset{O}{\|}}{C}-C_2H_5)_2$ | 1 |
| 3 | $(C_6H_5)_3Bi(O-\underset{\underset{O}{\|}}{C}-C_9H_{19})_2$ | 1 |
| 4 | $(C_8H_{17})_2Bi-O-\underset{\underset{O}{\|}}{C}-CH_3$ | 1 |
| 5 | $Bi(O-\underset{\underset{O}{\|}}{C}-C_7H_{15})_3$ | 2 |
| 6 | $Bi(O-\underset{\underset{O}{\|}}{C}-C_7H_{15})_5$ | 2 |
| 7 | $Bi(O-\underset{\underset{O}{\|}}{C}-CH_2-C_6H_5)_3$ | 2 |
| 8 | $Bi(O-\underset{\underset{O}{\|}}{C}-CH_2Cl)_3$ | 2 |
| 9 | $Bi(O-\underset{\underset{O}{\|}}{C}-C_6H_4-N(CH_3)_2)_5$ | 2 |
| 10 | $Bi(O-\underset{\underset{O}{\|}}{C}-R)_3$ (R = acid napthene radical) | 2 |
| 10 bis | $Bi(O-\underset{\underset{O}{\|}}{C}-R)_5$ (R = acid napthene radical) | 2 |
| 11 | $(C_3H_7)_2Bi-Br$ | 3 |
| 12 | $(C_4H_9)_3Bi-Cl_2$ | 3 |
| 13 | $C_4H_9BiCl_2$ | 3 |
| 14 | $(C_3H_7)_4BiCl$ | 3 |
| 15 | $(C_4H_9)_2Bi-O-Bi(C_4H_9)_2$ | 4 |
| 16 | $(C_6H_5)_4Bi-O-Bi(C_6H_5)_4$ | 4 |
| 17 | $(CH_3)_4Bi-O-Bi(CH_3)_4$ | 4 |
| 18 | $C_4H_9-\underset{OCOCH_3}{\underset{\|}{Bi}}-O-\underset{OCOCH_3}{\underset{\|}{Bi}}-C_4H_9$ | 5 |
| 19 | $(C_6H_5)_3Bi-O-Bi(C_6H_5)_3$ with $OCO(CH_2)_2N(CH_3)_2$ substituents | 5 |
| 20 | $(C_8H_{17})_2\underset{(OCOCH_3)_2}{\underset{\|}{Bi}}-O-\underset{(OCOCH_3)_2}{\underset{\|}{Bi}}(C_8H_{17})_2$ | |
| 21 | $(C_6H_5)_5Bi$ | 6 |
| 22 | $[(CH_3)_3C]_3Bi$ | 6 |
| 23 | $ClBi(O-\underset{\underset{O}{\|}}{C}-C_7H_{15})_2$ | 7 |
| 24 | $Br_2Bi(O-\underset{\underset{O}{\|}}{C}-C_6H_4Cl)_3$ | 7 |
| 25 | $Bi(OC_2H_5)_3$ | 8 |
| 26 | $Bi(S-CH_2-C_6H_4-C_9H_{19})_5$ | 8 |

TABLE III-continued

Formulae of bismuth compounds of example of Table II

| Reference number of Bi compound used in examples | Chemical formula | Number of formula of Table I |
|---|---|---|
| 27 | CH$_3$—Bi(O—CH—CH$_3$)(O—CH$_2$) (ring) with CH$_3$ on carbon | 9 |
| 28 | C$_4$H$_9$Bi(OC$_2$H$_5$)$_2$ | 10 |
| 29 | (CH$_3$)$_3$Bi(OR)$_2$  (R = oleyl) | 10 |
| 30 | Cl—Bi(—O—CH$_2$—C$_6$H$_4$—OCH$_3$)$_2$ | 11 |
| 31 | Br$_2$Bi—S—C$_3$H$_7$ | 11 |
| 32 | Bi(—N(C$_8$H$_{17}$)(C$_8$H$_{17}$))$_3$ | 12 |
| 33 | Bi(—N(C$_2$H$_5$)(C$_2$H$_5$))$_5$ | 12 |
| 34 | (CH$_3$)$_2$Bi—N(CH$_3$)(CH$_3$) | 13 |
| 35 | C$_6$H$_5$—Br(—N(CH$_3$)(CH$_3$))$_2$ | 13 |

Significance of signs, names, abbreviations and experimental conditions used in Tables II and III (1) Formulations (ingredients)
(a) Polyols CP 4800: reactive polyether triol with a hydroxyl index or number of about 35, known under the commercial designation "Voranol CP 4800" of Dow Chemical.

D 3900: reactive polyether triol with hydroxyl index of about 35, known under the commercial designation "Desmophene 2100" of Bayer;

Caradol 36-1: commercial designation of reactive polyether triol with hydroxyl index of about 35 of Shell.

F 50: slightly cross-linked polyester polyol with a hydroxyl index of about 50 and known under the commercial designation "Fomrez 50" of the firm Witco.

Ter 555: same kind as CP 4800, hydroxyl index: ±35, commercial designation: Tercarol 555 of Carbochimique.

E 39: same kind as CP 4800, however polyether diol/triol, hydroxyl index: ±27, commercial designation: Caradol E 34, Shell.

D 7963: same kind as D 3900 but hydroxyl index: ±27, commercial designation: Desmophene 7963, Bayer.

CM 11: reactive polyether triol, grafted by a mixture of polyacrylonitrile and polystyrene (type "polymer polyol"), hydroxyl index: ±32, commercial designation: Niax CM 11, Union Carbide.

G 310: polyether triol (glycerine-propylene oxide) with hydroxyl index of about 550, commercial designation: Tercarol G 310, Carbochimique.

PRX: internal code for a polyether hexol based on sorbitol +a mixture of propylene oxide and ethylene oxide, percentage of primary OH: ±50%, hydroxyl index: ±400.

UG 3602: polyether octol (sucorose+propylene oxide), hydroxyl index: ±400, commercial designation: Ugipol 3602, Ugine Kuhlman.

UG 3540: polyether hexol (sorbital+propylene oxide), hydroxyl index: ±490, commercial designation: Ugipol 3540, Ugine Kuhlman.

PCP 307: polycaprolactone, type polyester polyol with a functionality of 3 (3 OH groups per molecule), hydroxyl index= ±560, commercial designation: polycaprolacton 303, Solvay.

(b) Polyisocyanates

Hylene W: commercial name of a Du Pont de Nemours product, comprising a stereoisomer of 4.4'-methylenebis (cyclohexylisocyanate) containing 32% of NCO groups.

IPDI: commercial designation of 3-isocyanatomethyl-3.5.5-trimethylisocyanate containing about 37.8% of NCO groups of Veba Chemie, Germany.

TMDI: 2.2.4-trimethyl hexamethylene diisocyanate containing 40% of NCO groups.

XDI: commercial designation of xylidene diisocyanate comprised of a mixture of 70% of meta-isomer and 30% of para-isomer, this mixture having a content of 45% of NCO groups.

H 3150: IPDI modified (containing urea and biuret groups) comprises 31.5% of NCO groups (by weight), commercial name: IPDI-Additive H 3150, Veba Chemie.

Prep.IPDI/
BD (30% NCO): prepolymer with terminal NCO groups, obtained from 100 gr IPDI+6.33 gr BD; contains 30% of NCO groups by weight).

Prep.Hylene
W/DPG (26% NCO): prepolymer with terminal NCO groups, obtained from 100 gr (Hylene W+6.55 gr DPG; contains 26% of NCO groups (by weight).

Prep.IPDI/
G310 (30% NCO): prepolymer with terminal NCO groups, obtained from 100 gr IPDI+11.0 gr G310; contains 30% of NCO groups (by weight).
Prep.IMDI/
PRX (32% NCO): prepolymer with terminal NCO groups, obtained from 100 gr TMDI+12.92 gr PRX; contains 32% of NCO groups (by weight)
Prep.IPDI/EG
(32% NCO): prepolymer with terminal NCO groups, obtained from 100 gr IPDI+3.47 gr EG; contains 32% of NCO groups (by weight).
(c) Swelling agents.
water: chemical agent allowing $CO_2$ to be formed
Freon: trichlorofluoromethane
MC: methylene chloride.
  (d) Crosslinkers-Chain extenders.
di EG: diethylene glycol.
Quadrol: commercial name of the firm Jefferson for N.N'-tetrahydroxy-isopropylethylene-diamine with hydroxyl number of about 770.
BD: 1.4-butanediol
TEOA: triethanolamine
TMP: trimethylolpropane
EG: ethylene glycol
DPG: dipropylene glycol
BED: 1.4-butanediol
PG: 1.3-propylene glycol
  (e) Initiators
DIPA: diisopropanolamine
DEOA: diethanolamine
IPDA: isophorone diamine
  (f) Antioxidants.
TPP: triphenyl phosphite
PDDP: phenyldiisodecyl phosphite
TRIS: tris(dipropylene glycol) phosphite
TIDP: tris-isodecyl phosphite
UV Absorber: 2-hydroxy-2-octoxybenzophenone
  (g) Surface active agents.
DC 193: polyoxyethylene-polysiloxane copolymer of Dow Corning
LK 221: surface active agent, non-silicone type of Air Products.
  2. Reaction characteristics.
These characteristics were determined in an open mould.
(a) Free RG: foam density in kg/m³ during free creaming and rise, namely in open mould.
(b) CRT: cream time in seconds
(c) RT: rise time in seconds
(d) TFT: tack free time, namely time after which a foam does not tack anymore during a free creaming.
(e) PL: pot life.
  3. Propertie of obtained moulded products.
(a) RG m: average overall density in kg/m³ after foaming in closed mould (overal molded density).
(b) Xenon test: ("scale x"): blue scale according to DIN 5004 specification according to which the beginning of a superficial degradation and/or discoloration of the samples is recorded.
  scale 5: corresponds to a test duration of about 160 hours.
  scale 6: corresponds to a test duration of about 260 hours.
  scale 7: corresponds to a test duration of about 320 hours.
  scale 8: corresponds to a test duration of about 550 hours.

As radiation source, a xenon lamp was used in a test room having a temperature of about 30° C. and a relative humidity of about 70%, while the sample temperature was about 45° C.
(c) ER: elongation at break in % according to:
  ISO 1798 specification in examples 1, 2, 3, 4.
  ASTM D412 specification in examples 5, 6, 7, 8, 13, 14
(d) RR: Tensile strength in kPa according to
  ISO 1798 specification for examples 1, 2, 3, 4
  ASTM D412 specification for examples 5, 6, 7, 8, 13, 14
(e) TR: Tear resistance in N/cm according to:
  ASTM D1564-71 specification for examples 1,2,3,4.
  ASTM D 624 specification for examples 5, 6, 7, 8, 13, 14.
(f) Shore A: is a measure of the skin hardness according to DIN 53505
(g) Shore D: is a measure of the skin hardness according to:
  DIN 53555 specification (examples 9,10,11,12,15)
  ASTM D 2240 specification (examples 5,6,7,8,13,14)
(h) E-flexure module in MPA, according to:
  ASTM D 790 specification (examples 5,6,7,8,13,14)
  DIN 53423 specification (examples 9,10,11,12,15)
(i) Impact strength in Joules, according to DIN 53547
(j) HDT: head distortion temperature, namely temperature of plastication—deformation in °C. according to DIN 53432.

TEST CONDITIONS

In examples referred to in Table II, tests were made with an injection machine of the Hennecke HK 100 or HK 265 type (high pressure).

In examples 1 to 4 and 13 to 15, the so-called casting Technique was applied, according to which the mixture of said ingredients was poured into an open mould which is then closed.

In examples 5 to 12, the so-called RIM technique was applied, according to which the mixing chamber of the injection machine is integral with the mould which remains closed when the mixture of ingredients is entered, injection being made under pressure in this case.

The test moulds used were thermostat-controlled moulds in cast aluminium. The internal sizes were:
for examples 1 to 4:20×20×4 cm;
for examples 5 to 8 and 13 to 15: 100×20×0.5 cm;
for examples 9 to 12: 50×50×1 cm.

The temperature of the moulds was about 55° C. in all the Examples.

The temperature of ingredients or starting materials was 22° to 25° C. in examples 1 to 4 and 9 to 12 and about 40° C. in Examples 5 to 8 and 13 to 15.

The time of withdrawal from the mould, namely the time from the injection into the mould to the withdrawal of the piece therefrom is 3 minutes for Examples 1 to 4; 2 minutes for Examples 5 to 8 and 13 to 15, and 6 minutes for Examples 9 to 12.

In each of Examples 1 to 15, referred to in Table II, three variants (a), (b) and (c) for the organo-bismuth compounds were considered, combined with other ingredients. The results given for each Example thus relate to said three variants.

The date given in Table II are amounts by weight to 100 parts by weight of polyol.

We claim:
1. An improved process for preparing integral skin polyurethane foam, wherein a reaction mixture com- prising polyol, polyisocyanate the NCO groups of which are not directly bonded to an aromatic group, no more than 0.5 part by weight of water to 100 parts by weight of polyol, and a catalyst is reacted in a mould, said improvement comprising using as the catalyst a synergistic combination of (a) at least one organic initiator containing at least one of a primary or secondary amino functional group, and (b) at least one organic compound of bismuth.

2. A process as claimed in claim 1, wherein the organic bismuth compound is a compound of the general formula I:

$$(R_1)_k-(Bi)_p-(Z)_q-Bi-(R_1)_n \quad\quad (I)$$
$$\phantom{(R_1)_k-}|\phantom{(Bi)_p-(Z)_q-}|$$
$$\phantom{(R_1)_k-}(Y)_j\phantom{-(Bi)_p-(Z)_q-}(Y)_m$$

wherein:
  $p=q=0$ or 1
  $k+j=2$ or 4 when $p=q=1$ or
  $k=j=0$ when $p=q=0$
  $m+n=3$ or 5 when $k=j=p=q=0$ or
  $m+n=2$ or 4 when $p=q=1$
  $m+n \approx 0$, m or n may possibly be equal to 0 but are not, however, simultaneously equal to 0;
  $R_1$ is an alkyl ($C_1$-$C_{12}$) radical which is substituted or not, a phenyl radical, a cycloalkyl ($C_5$-$C_6$) radical or a halogen atom;
  Z represents oxygen or sulfur;
  Y is a halogen atom, a $-O-CO-R_2$, $-OR_2$, $-SR_2$, $$\begin{array}{c}\diagdown\phantom{xx}\diagdown\\ O\phantom{xx}S\phantom{xxxx}R_2\\ \diagdown\phantom{x}\diagdown\phantom{xxx}/\\ \phantom{xx}R_3\phantom{xx}R_3\text{ or }-N\\ /\phantom{x}/\phantom{xxx}\diagdown\\ O\phantom{xx}S\phantom{xxxx}R_2\\ /\phantom{xx}/\end{array}$$

group wherein $R_2$ may represent (1) an alkyl ($C_1$-$C_{20}$) radical, an alkenyl ($C_2$-$C_{20}$) radical, a cycloalkyl ($C_5$ or $C_6$) radical, a phenyl radical, a benzyl radical, which are unsubstituted or substituted by one or more alkyl ($C_1$-$C_{12}$) or alkenyl ($C_2$-$C_{12}$) radicals, one or more halogen atoms, one or more hydroxy, $-OR$, $-N(R)_2$ or $-SR$ radicals, or (2) a phenyl radical which is substituted by one or more CHO, $-CO-R$ or COOR groups, R being an alkyl ($C_1$-$C_{12}$), alkenyl ($C_2$-$C_{12}$), cycloalkyl ($C_5$-$C_6$), phenyl, or benzyl radical, which is unsubstituted or substituted by one or more alkyl ($C_1$-$C_{12}$) or alkenyl ($C_2$-$C_{12}$) radicals, one or more halogen atoms, or hydroxy radicals, and $R_3$ is a group $(-CR_4R_5)_x$ wherein $x=2$ or 3 and $R_4$ and $R_5=H$, $CH_3$ or $C_2H_5$.

3. A process as claimed in claim 2, wherein the organic bismuth compound is a compound of the formula I wherein $R_1$ is an alkyl ($C_1$-$C_4$) radical, a phenyl radical or a halogen atom.

4. A process as claimed in claim 2, wherein the organic bismuth compound is a compound of the formula I wherein the halogen atom is chlorine or bromine.

5. A process as claimed in claim 2, wherein the organic bismuth compound is a compound of formula I wherein Z is oxygen.

6. A process as claimed in claim 2, wherein the organic bismuth compound is a compound of the formula I wherein $R_2$ is one of the following substituents:

(a) phenyl and benzyl radicals
(b) alkyl ($C_1$-$C_{12}$) radicals
(c) radicals issuing from naphthenic acid
(d) radicals of the formula $-CR'_sR''_r$ wherein $s+r=3$, $R'$ and $R''$ are a chlorine or bromine atom or hydrogen;
(e) radicals $(CH_2)_iOH$, $(CH_2)_iOR$, $(CH_2)_iN(R)_2$ and $(CH_2)_iSR$, wherein i may vary from 1 to 4;

7. A process as claimed in claim 1 or 2, wherein the organic bismuth compound is a compound of the formula II:

$$(Y)_m-Bi-(R_1)_n \quad\quad (II)$$

wherein $n+m=3$ or 5, $R_1$ is an alkyl, phenyl or cycloalkyl radical and Y is a halogen atom or a group $-O-CO-R_2$, in which $R_2$ is as described in claim 2.

8. A process as claimed in claim 2, wherein the organic bismuth compound is a compound of the formula III:

$$Bi(Y)_m \quad\quad (III)$$

wherein $m=3$ or 5 and Y is a group $-O-CO-R_2$ in which $R_2$ is as described in claim 2.

9. A process as claimed in claim 2, wherein the organic bismuth compound is a compound of the formula IV:

$$(R_1)_k-Bi-Z-Bi(R_1)_n \quad\quad (IV)$$

wherein h and $n=2$ or 4, $R_1$ is an alkyl, phenyl or cycloalkyl radical and Z is sulfur or oxygen.

10. A process as claimed in claim 2, wherein the organic bismuth compound is a compound of the formula V:

$$(R_1)_k-Bi-Z-Bi-(R_1)_n \quad\quad (V)$$
$$\phantom{(R_1)_k-}|\phantom{Bi-Z-}|$$
$$\phantom{(R_1)_k-}(Y)_j\phantom{Bi-Z-}(Y)_m$$

wherein:
  $k+j$ and $n+m=2$ or 4;
  $R_1$ is an alkyl, phenyl or cycloalkyl radical;
  Y is a halogen atom or a group $-O-CO-R_2$ in which $R_2$ is as described in claim 2, and Z is oxygen or sulfur.

11. A process as claimed in claim 2, wherein the organic bismuth compound is a compound of the formula I, wherein Y is a $-O-CO-R_2$ radical or a halogen atom, in which $R_2$ is as described in claim 2.

12. A process as claimed in claim 2, wherein the organic bismuth compound is a compound of the formula I and the bismuth is trivalent.

13. A process as claimed in claim 1 or 2, wherein the organic initiator is at least one compound selected from the group consisting of: ethylamine, butylamine, hexylamine, laurylamine, octylamine, propylamine, pentylamine, heptylamine, nonylamine, decylamine, undecylamine, heptadecylamine, oleylamine, benzylamine, allylamine, N-2-aminoethylmorpholine, N-3-aminopropylmorpholine, cyclohexylamine, 2-, 3- or 4-chlorobenzylamine, 1,3-dimethylamine, 2,5-dimethylbenzylamine, o-, m-, or p-methoxybenzylamine, 3-N-dimethyl-(diethyl)amino-1,3-propanediamine, 2-amino-5N-diethylaminopentane, N-(3-aminopropyl)-2-pyrrolidone, diethylamine, di(iso)propylamine, dibutylamine, dioctylamine, dihexylamine, dinonylamine, dicyclohexylamine, N-methyloctadecylamine, N-ethylbenzylamine, N-propylbenzylamine, pyrazole, pyrrole, pyrrolidine, piperidine, morpholine, 2-(2-hydroxyethyl)-piperidine, bis(2-chloroethyl)amine, N,N-bis(2,2-diethoxyethyl)amine, 1,2-diaminopropane, 1,3-diaminopropane, ethylene diamine, 1,4-diaminodecane, 1,5-diaminopentane, 1,6-diaminohexane, 1,10-diaminodecane, 1,12-diaminododecane, isophorondiamine, 2,2,4-trimethyl-hexamethylene-diamine, a polyoxypropyleneamine comprising the reaction product of an aliphatic terminally-branched, primary diamine or triamine with polypropylene glycol or triol, 1,4-bis(3-aminopropyl)piperazine, N,N'-dimethyl-(diethyl)-ethylenediamine, 4,4-trimethylenedipiperidine, 3-ethylamino-1-propylamine, 3-butylamino-1-propylamine, 3-ethylpropylamino-1-propylamine, an N-(alkyl)-propylene diamine, an N-(alkyl)-dipropylene triamine, dimethylenetriamine, triethylenetriamine, tetraethylenepentamine, pentaethylenehexamine, N-isopropyl-2-methyl-1,2-propanediamine, N-(2-aminoethyl)-piperazine, 1-(β-aminoethyl)-2-imidazolidone, 3,3'-imino-bispropylamine, bis(2-aminopropyl)-amine, bishexamethylenetriamine, monoethanolamine, isopropanolamine, 3-amino-1-propanol, 3-amino-1,2-propanediol, 2-amino-2-methyl-1-propanol, 2-amino-2-methyl-1,3-propanediol, 2-amino-1-butanol, 6-amino-1-hexanol, 1,3-diamino-2-propanol, diethanolamine, diisopropanolamine, 2-(2,2-aminoethylamino)ethylaminoethanol, N-aminoethylethanolamine, N,N'-bis(2-hydroxyethyl)-1,2-diaminocyclohexane, N,N'-hydroxymethyl)-amino-ethane and 2-(2-methanolaminoethyl)amino-ethanol.

14. A process as claimed in claim 1, wherein the organic bismuth initiator is a compound comprising at least two functional groups, at least one of which is the functional group of a primary or secondary amine.

15. A process as claimed in claim 1, wherein as catalyst comprised of the synergistic combination, 0.1 to 10 parts by weight of the organic bismuth compound are used to 100 parts by weight of polyol.

16. A process as claimed in claim 15, wherein the catalyst, comprises 0.2 to 4 parts by weight of the bismuth compound to 100 parts by weight of polyol.

17. A process as claimed in claim 1, wherein the catalyst comprises 0.2 to 5 parts by weight of a monofunctional initiator to 100 parts by weight of polyol.

18. A process as claimed in claim 17, wherein the catalyst, comprises 0.2 to 3 parts by weight of a monofunctional initiator to 100 parts by weight of polyol.

19. A process as claimed in claim 13, wherein the catalyst comprises 0.2 to 20 parts by weight of an initiator having at least two functional groups to 100 parts by weight of polyol.

20. A process as claimed in claim 19, wherein the catalyst comprises 1 to 10 parts by weight of an initiator having at least two functional groups to 100 parts by weight of polyol.

21. A process as claimed in claim 1, wherein a cross-linking agent is used.

22. A process as claimed in claim 21, wherein a cross-linking agent is used except when the catalyst comprises more than 2 parts by weight of an initiator having at least two functional groups.

23. A process as claimed in claim 1, wherein from 2 to 30 parts by weight of a physical swelling agent to 100 parts of polyol is used.

24. A process as claimed in claim 1, wherein no more than 0.5 part by weight of a chemical swelling agent, such as water, are used to 100 parts by weight of polyol.

25. A process as claimed in claim 1, wherein the polyisocyanate is an aliphatic or alicyclic polyisocyanate.

26. A process as claimed in claim 2, wherein said halogen atom is a chlorine, bromine, fluorine or iodine atom.

27. A process as claimed in claim 6, wherein said alkyl radicals (b) are selected from the group consisting of radicals of organic salts of carboxylic acids selected from the group consisting of acetate, propionate, butyrate, amylate, hexoate, octoate, 2-ethylhexanoate, decanoate, monoate, undecanoate, and laurate; and said naphthenic acid radicals (c) are a natural product forming a mixture of substituted cyclopentane of the formula $R_2COOH$.

28. A process as claimed in claim 27, wherein $R_2COOH$ is selected from the group consisting of

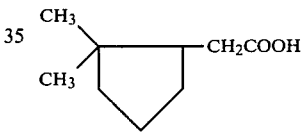

and

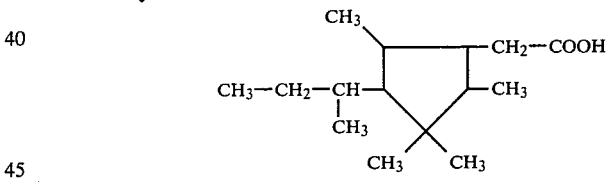

29. A process as claimed in claim 22, wherein said catalyst comprises more than 4 parts by weight of said initiator.

30. A process as claimed in claim 23, wherein said swelling agent is trichlorofluoromethane, methylene chloride or a mixture thereof.

* * * * *